United States Patent
Conner et al.

[11] Patent Number: 6,054,687
[45] Date of Patent: Apr. 25, 2000

[54] HEATING APPARATUS FOR A WELDING OPERATION AND METHOD THEREFOR

[75] Inventors: Jeffrey A. Conner, Hamilton, Ohio; William R. Stowell, Rising Sun, Ind.; John F. Ackerman, Laramie, Wyo.; John M. Powers, Independence, Ky.; Thomas F. Broderick, Springboro, Ohio

[73] Assignee: General Electric Company, Cincinnati, Ohio

[21] Appl. No.: 09/224,891

[22] Filed: Dec. 31, 1998

[51] Int. Cl.[7] .............................. F27D 13/00; F21V 7/22; G02B 5/12; G02B 5/26
[52] U.S. Cl. ................... 219/405; 250/504 R; 362/307; 392/422
[58] Field of Search ..................... 219/405, 411; 250/503.1, 504 R; 362/307, 310; 392/416, 422; 313/112, 113; 359/359, 360, 884

[56] References Cited

U.S. PATENT DOCUMENTS

| | | | |
|---|---|---|---|
| 3,718,497 | 2/1973 | Rice | 392/422 |
| 4,340,646 | 7/1982 | Ohno et al. | 359/884 |
| 4,448,855 | 5/1984 | Senaha et al. | 359/884 |
| 4,524,410 | 6/1985 | Kawakatsu et al. | 313/112 |
| 5,138,219 | 8/1992 | Krisl et al. | 359/359 |
| 5,319,179 | 6/1994 | Joecks et al. | 219/137 R |
| 5,412,274 | 5/1995 | Parham | 313/112 |
| 5,608,227 | 3/1997 | Dierks et al. | 250/504 R |
| 5,898,180 | 4/1999 | Venkataramani et al. | 250/504 R |
| 5,905,269 | 5/1999 | Venkataramani et al. | 250/504 R |

FOREIGN PATENT DOCUMENTS

| | | |
|---|---|---|
| 816875 | 1/1998 | European Pat. Off. . |
| 8-212819 | 8/1996 | Japan . |

*Primary Examiner*—Joseph Pelham
*Attorney, Agent, or Firm*—Andrew C. Hess; Gerry S. Gressel

[57] ABSTRACT

A heating apparatus and method for welding a superalloy article. In a preferred embodiment, the apparatus and method entail welding a superalloy article within an enclosure equipped with a thermal radiation-generating device that preheats the article to a temperature of at least 1500° F. prior to welding. The invention more particularly provides a thermally-reflective coating on a reflector member positioned adjacent the thermal radiation-generating device for the purpose of reflecting thermal radiation emitted by the device into the enclosure. The device is then operated to heat the superalloy article to a suitable temperature, e.g., 1500° F. or more, after which a welding operation is performed on the superalloy article.

20 Claims, 2 Drawing Sheets

HEATING APPARATUS FOR A WELDING OPERATION AND METHOD THEREFOR

FIELD OF THE INVENTION

This invention relates to apparatuses and methods for welding superalloy components. More particularly, this invention is directed to a reflective coating for increasing the reflectivity of a reflector adjacent a lamp used to preheat and maintain a superalloy component at an elevated temperature during a welding operation.

BACKGROUND OF THE INVENTION

High temperature cobalt and nickel-based superalloys are widely used to form certain components of gas turbine engines, including combustors and turbine vanes and blades. While high-temperature superalloy components are often formed by casting, circumstances exist where superalloy components are preferably or are required to be fabricated by welding. For example, components having complex configurations, such as turbine midframes and shroud support rings, can be more readily fabricated by welding separate castings together. Therefore, it is often more practical and cost effective to fabricate complex components by welding rather than casting the component as a unitary part.

In addition to the above, welding is widely used as a method for restoring blade tips, and for repairing cracks and other surface discontinuities in superalloy components caused by thermal cycling or foreign object impact. Because the cost of components formed from high-temperature cobalt and nickel-based superalloys is relatively high, restoring/repairing these components is typically more desirable than replacing them when they become worn or damaged.

Superalloy components have been preheated prior to welding and then continuously heated during welding to improve welding yields. For this purpose, preheat temperatures in excess of about 1500° F. (about 815° C.) and often above 1700° F. (925° C.) may be used. Heating and welding of superalloy components in this manner are often performed in an enclosure containing a controlled atmosphere (e.g., an inert gas) using such welding techniques as tungsten inert gas (TIG) and laser welding processes. Preheating is typically performed by induction or with the use of lamps, particularly quartz halogen lamps. Lamps heat their targeted superalloy components by thermal radiation, and are therefore often equipped with a polished aluminum reflector that reflects thermal radiation into the enclosure toward the component to be welded. When used as the heat source, a lamp is at times operated with a higher input voltage than what the lamp is rated for, e.g., a lamp rated for 90 to 100 volts might be operated at 105 to 110 volts. The result is a dramatic decrease in lamp life and less than optimal component temperature control.

Accordingly, it would be desirable if improved heating efficiency could be achieved for a welding apparatus used to perform welding operations on superalloy articles. In particular, it would be desirable if superalloy articles could be heated more rapidly and efficiently with such an apparatus, while maintaining temperature control and increasing the life of the device used to heat the articles.

BRIEF SUMMARY OF THE INVENTION

The present invention generally provides a heating apparatus and method for welding a superalloy article. In a preferred embodiment, the apparatus and method entail welding a superalloy article within an enclosure equipped with a thermal radiation-generating device that preheats the article to a temperature of at least 1500° F. prior to welding. The invention more particularly provides a thermally-reflective coating on a reflector member positioned adjacent the thermal radiation-generating device for the purpose of reflecting thermal radiation emitted by the device into the enclosure. The device is then operated to heat the superalloy article to a suitable temperature, e.g., 1500° F. or more, after which a welding operation is performed on the superalloy article.

In accordance with this invention, the thermally-reflective coating comprises at least one pair of reflective layers, each layer being formed of a material that is essentially transparent to electromagnetic wavelengths of between 500 and 3000 nanometers (nm). In addition, the material of the outermost layer of the pair has a higher index of refraction than the material of the other layer of the pair. Coatings of this invention have been shown to increase the reflectivity of a conventional aluminum reflector to more than 90% for electromagnetic wavelengths of about 700 to about 1250 nm, which is within the spectrum for thermal radiation (near-infrared) produced by thermal radiation-generating lamps, such as quartz halogen lamps. Accordingly, a quartz halogen lamp can be operated at relatively lower power inputs yet sufficiently heat the superalloy article to perform a desired welding operation on the article, such as TIG or laser welding to assemble or repair the article. Consequently, the apparatus of the present invention is able to more rapidly and efficiently heat a superalloy article to be welded for a given power input. The apparatus can also be operated in a manner that increases the life of the lamp by reducing the power required to achieve a desired temperature when preheating and welding the article. Finally, this invention promotes the ability to control the temperature of the article through adjustment of the input to the lamp.

Other objects and advantages of this invention will be better appreciated from the following detailed description.

DETAILED DESCRIPTION OF THE INVENTION

The present invention is generally directed to superalloy articles that must undergo a welding operation during their fabrication and/or repair. While the advantages of this invention will be described with reference to components of gas turbine engines, the invention is also applicable to a variety of applications in which an article is to be heated by a device that emits thermal radiation.

Enclosures for performing a welding operation such as TIG or laser welding in a controlled atmosphere are known, as are thermal radiation heating devices that include a variety of lamp designs. In the past, lamps such as quartz halogen lamps have been equipped with polished aluminum reflectors to promote the reflection of heat (thermal radiation) toward the intended superalloy target. Aluminum reflectors known in the art may be formed of aluminum or provided with an aluminum coating. Examples of the latter are sputtered aluminum coatings, which may be protected with a corrosion-resistant coating to inhibit the formation of aluminum oxide (alumina) that would degrade the reflectivity of the aluminum.

Figure 1:
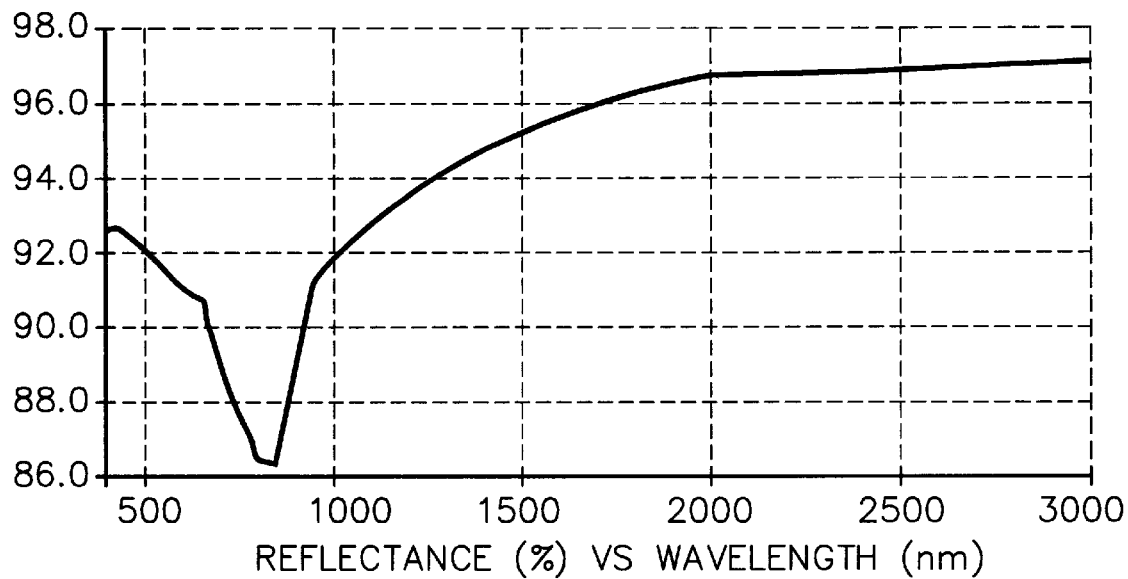
FIG. 1 is a graph showing the reflectance versus wavelength plot for an aluminum reflector of the prior art.

During an investigation leading to this invention, the thermal radiation characteristics of a polished aluminum reflector were analyzed, the result of which is depicted in FIG. 1. According to the data of FIG. 1, the reflectance of polished aluminum drops considerably at wavelengths of between about 500 to about 1000 nm, which includes the shorter wavelengths of infrared radiation emitted by a conventional quartz halogen lamp. Thermal radiation is generally in the infrared range of about 780 to about $1 \times 10^6$ nm, while electromagnetic radiation emitted by quartz halogen lamps includes visible radiation (about 380 to about 780 nm) and thermal radiation. As a result, the reflectance of polished aluminum is relatively low for thermal radiation near the lower end of the infrared spectrum, which reduces the amount of radiant heating that occurs when attempting to heat a superalloy specimen with a halogen lamp.

Figure 2:
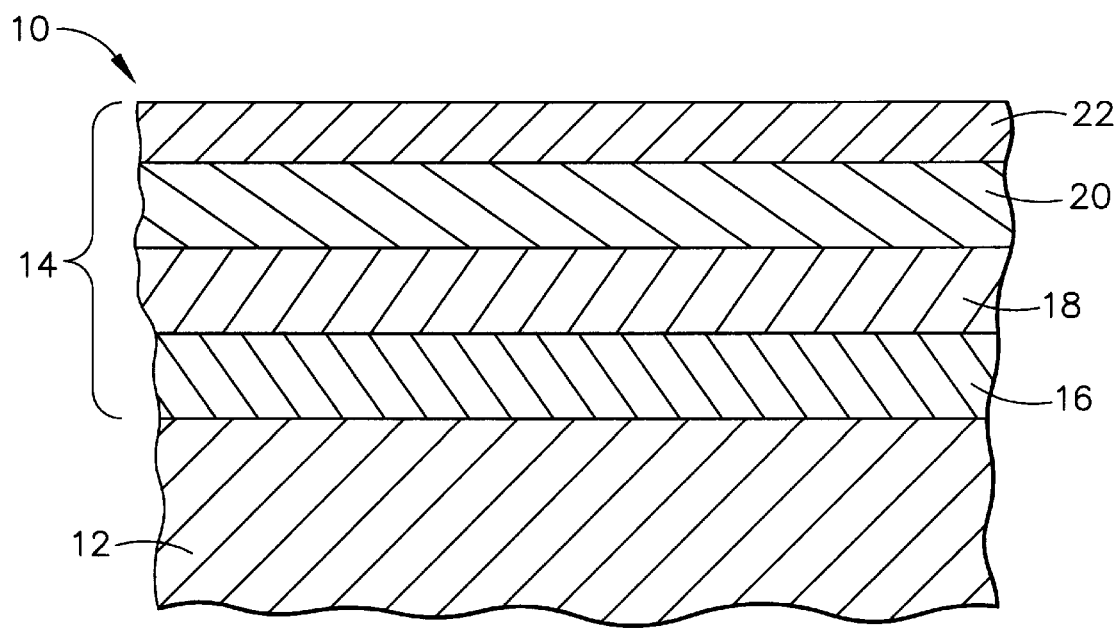
FIG. 2 shows in cross-section a portion of a quartz halogen lamp reflector with a reflective coating in accordance with this invention.

Represented in FIG. 2 is a cross-section of a reflector 10 employed by this invention to promote the reflection of infrared radiation emitted by a thermal radiation heat source, such as a quartz halogen lamp (not shown). The reflector 10 includes an aluminum substrate 12 which may form the entire base structure of the reflector 10, or may be limited to a coating on the reflector 10. A ceramic coating system 14 is represented as having been deposited on the surface of the aluminum substrate 12. The coating system 14 (not shown to any particular scale) is shown as comprising four layers 16, 18, 20 and 22 of ceramic materials, which will be discussed below as paired layers 16/18 and 20/22.

It is within the scope of this invention that any number of paired layers could be used. The significance of using pairs of layers is based on the optical construction interference effect of two materials that are transparent to the wavelengths of interest, but have different indices of refraction to achieve phase augmentation of the wavelengths to be reflected by the reflector 10. Those skilled in the art will appreciate that phase augmentation requires each pair of layers 16/18 and 20/22 to have different indices of refraction, with the layer nearest the source of radiation (e.g., layer 18 of paired layers 16/18 and layer 22 of paired layers 20/22) having the higher index. In addition, the layers of a given pair preferably have different thicknesses based on the wavelength to be reflected and their respective indices of refraction according to the quarter-wave equation:

$$t = \lambda/4n$$

where t is the required thickness of a coating layer in nanometers, $\lambda$ (lambda) is the wavelength of interest in nanometers, and n is the index of refraction of the coating layer material.

The four-layer coating system 14 shown in FIG. 2 is preferred because it provides a balance between performance (reflectivity) and processing and cost considerations, though the desired optic effect can be enhanced with additional paired layers. Suitable ceramic materials for the layers 16, 18, 20 and 22 include refractory fluorides and metal oxides such as silica ($SiO_2$), alumina ($Al_2O_3$), titania ($TiO_2$), tantala ($Ta_2O_5$), zirconia ($ZrO_2$), thoria ($ThO_2$) and niobium oxide ($Nb_2O_5$), though other oxides could be used. These materials can be categorized for purposes of this invention as either high or low index materials. For example, sputtered refractory fluorides, silica and alumina have relatively low indices of refraction, generally in the range of about 1.25 to about 1.7, while titania, tantala, zirconia and niobium oxide have higher indices of refraction, generally in the range of about 2 to about 2.3. While oxides are preferred materials for the layers 16, 18, 20 and 22 of the coating system 14 because of their high temperature capability, it is possible that other materials could be used if they meet the requirements for thermal stability at temperatures above 1500° F., transparency to the wavelengths of interest, and provide indices of refraction compatible with the reflectivity sought for the coating system 14.

Based on the quarter-wave equation noted above, suitable thicknesses for the coating system 14 will be dependent on the materials used and the number of layers that form the coating system 14. Also from the equation, the coating layers with the lower indices of refraction (e.g., 16 and 20) are thicker than the layers with the higher indices of refraction (e.g., 18 and 22). More particular, for a given wavelength of interest, the low-index layers (e.g., 16 and 20) are thicker than the high-index layers by a factor inversely proportional to their indices of refraction. In one example, layers 16 and 20 are silica, while layers 18 and 22 are titania. Based on indices of refraction of about 1.5 and 2.2 for silica and titania, respectively, if radiation having a wavelength of between about 700 and 1300 nm is to be reflected, a suitable thickness for the silica layers 16 and 20 is about 117 to 217 nm, and a suitable thickness for the titania layers 18 and 22 is about 80 to 148 nm. The total thickness for this coating system 14 would then be in the range of about 394 to 734 nm. More generally, a coating system 14 of this invention has a total thickness of about 100 to about 5000 nm, with a preferred thickness being about 480 nm.

Figure 3:
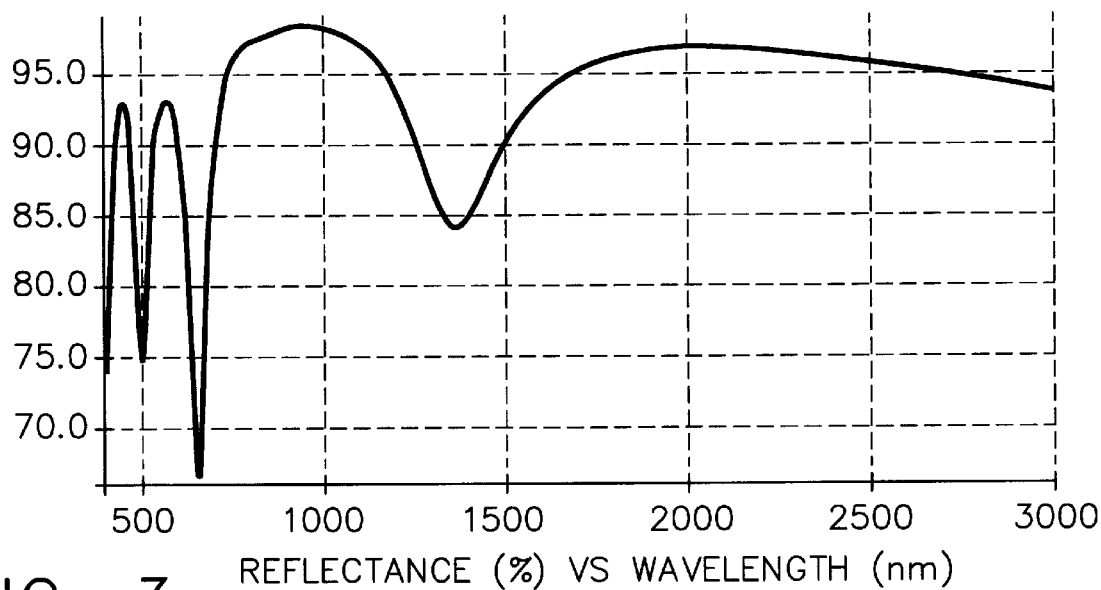
FIG. 3 is a graph showing the reflectance versus wavelength plot for the coated aluminum reflector of FIG. 2.

In practice, coating systems similar to that shown in FIG. 2 have been successfully sputtered on polished sputtered aluminum coatings of conventional reflectors. During the investigation leading to this invention, a test identical to that used to generate the data of FIG. 1 was performed on a reflector having a polished sputtered aluminum surface and coated with four layers of ceramic, the first and third (layers 16 and 18, respectively, of FIG. 2) being silica while the second and fourth (layers 20 and 22, respectively, of FIG. 2) being titania. The thicknesses of the first and third (silica) layers were about 141 nm and 156 nm respectively, while the thicknesses of the second and fourth (titania) layers were about 97 nm and 87 nm respectively, yielding a total coating thickness of about 481 nm. As evidenced in FIG. 3, the coated reflector of this invention exhibited a reflectivity of greater than 90% for electromagnetic wavelengths of about 700 to about 1250 nm when subjected to the white light of a quartz halogen lamp, and in excess of 95% for wavelengths of about 750 to about 1200 nm. Over the range of about 700 to about 1300 nm, the reflector exhibited an average reflectivity of about 95.7%. A comparison of FIG. 3 with FIG. 1 illustrates the beneficial improvement in reflectivity of the coated reflector of this invention over the uncoated reflectors of the prior art when evaluated under identical conditions. In effect, the coating system of this invention compensated for the relatively poor reflectivity of polished aluminum between wavelengths of about 500 and 1000 nm.

Figure 4:
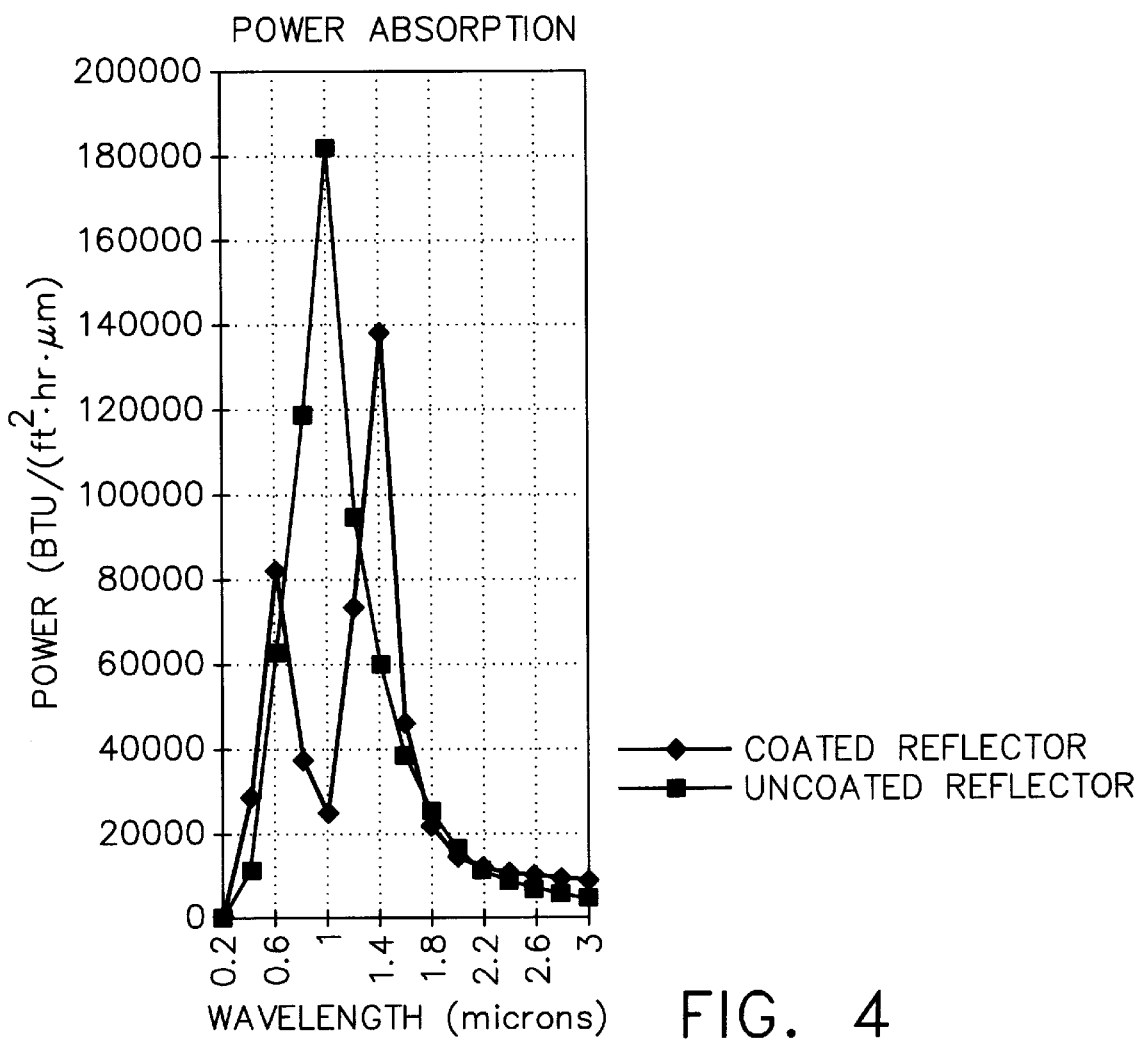
FIG. 4 is a graph comparing the power absorption versus wavelength plot for an aluminum reflector of the prior art and the coated aluminum reflector of FIG. 2.

A further comparison of coated reflectors in accordance with this invention and uncoated reflectors of the prior art can be seen in FIG. 4, which compares the power absorption (in $BTU/(ft^2 \cdot hr \cdot \mu m)$) of a conventional uncoated polished aluminum reflector and the polished aluminum reflector coated with the four-layer ceramic coating system described above. Under identical test conditions, the coated reflector of this invention exhibited a marked drop in power absorption between peaks at wavelengths of about 0.6 and 1.4 micrometers (600 and 1400 nm). In contrast, the uncoated reflector of the prior art exhibited a peak absorption at about 1.0 micrometers (about 1000 nm) that was about nine times greater than the absorption of the coated reflector at the same wavelength. Over the wavelengths tested, the uncoated reflector absorbed about 96,600 BTU/(ft$^2$·hr) more than the coated reflector of this invention.

Based on the enhanced reflectivity of reflectors coated in accordance with this invention, it is possible to use quartz halogen lamps (or another suitable thermal radiation-generating lamp) at lower input voltages to achieve the same heating effect as the same lamp with an uncoated aluminum reflector of the prior art. Accordingly, a particular benefit of this invention is that improved reflector performance results in improved heating of a superalloy article prior to welding, which allows a superalloy component to be more rapidly heated and/or heated to a higher temperature. Another benefit of coated reflectors of this invention is that reduced voltage inputs can be used to achieve a desired heating rate, leading to increased lamp life as compared to the prior art in which the use of excessive voltage levels resulted in shortened lamp life. Finally, the coating system 14 of this invention promotes the ability to control the temperature of an article through adjustment of the input to the lamp. For example, if rotation of the article results in a smaller surface area being exposed to the lamp while the lamp is operated near full power, cooling would occur because additional power would not be available to increase lamp output and maintain the article temperature. However, with this invention, a lamp can be operated well below full power to achieve a comparable temperature, so that additional power is available to compensate for article rotation.

While discussed in terms of a coating for a reflector of a thermal radiation heat source, the coating system 14 of this invention could also be applied to the interior of the enclosure in which a superalloy is to be welded. An additional benefit of the coating system 14 is to act as an anti-stick coating, making it easier to remove deposits that form on the reflector and enclosure during welding.

While the invention has been described in terms of a preferred embodiment, it is apparent that other forms could be adopted by one skilled in the art, such as by substituting other suitable coating and substrate materials, or by utilizing various methods for depositing the coating layers.

Accordingly, the scope of the invention is to be limited only by the following claims.

What is claimed is:

1. A welding apparatus comprising:
    an enclosure having an interior;
    a thermal radiation-generating device for heating the interior of the enclosure;
    a reflector member adjacent the lamp for reflecting thermal radiation generated by the thermal radiation-generating device into the interior of the enclosure; and
    a thermally-reflective coating on a surface region of the reflector member, the coating comprising at least two adjacent pairs of layers formed of materials that are substantially transparent to infrared radiation at a predetermined wavelength, the at least two adjacent pairs of layers comprising a first layer, a second layer on the first layer, a third layer on the second layer, and a fourth layer on the third layer, the fourth layer being an outermost layer of the coating, the second and fourth layers being formed of a material having an index of refraction of about 2 to 2.3, the first and third layers being formed of a material having an index of refraction of about 1.25 to 1.7, the first and third layers being thicker than the second and fourth layers.

2. A welding apparatus as recited in claim 1, wherein the reflector member with the coating has a reflectivity of greater than 90% for electromagnetic wavelengths of about 700 to about 1250 nanometers.

3. A welding apparatus as recited in claim 1, wherein the material of the second and fourth layers is selected from the group consisting of titania, tantala, zirconia and niobium oxide, and wherein the material of the first and third layers is selected from the group consisting of refractory fluorides, silica and alumina.

4. A welding apparatus as recited in claim 1, wherein the first layer is thicker than the second layer by a factor inversely proportional to their indices of refraction, and the third layer is thicker than the fourth layer by a factor inversely proportional to their indices of refraction.

5. A welding apparatus as recited in claim 1, wherein the coating has a thickness of up to about 5000 nanometers.

6. A welding apparatus as recited in claim 1, wherein the coating consists of the first, second, third and fourth layers.

7. A welding apparatus as recited in claim 1, wherein the materials of all layers of the coating are substantially transparent to electromagnetic wavelengths of between 500 and 3000 nanometers.

8. A welding apparatus as recited in claim 1, wherein the surface region of the reflector member is formed of aluminum, the coating overlaying and contacting the surface region.

9. A welding apparatus as recited in claim 1, wherein the second and fourth layers have thicknesses of about 80 to about 148 nm, and the first and third layers have thicknesses of about 117 to about 217 nm.

10. A welding apparatus as recited in claim 1, wherein the thermal radiation-generating device is operable to heat a superalloy article enclosed in the enclosure to a temperature of at least 1500° F.

11. A heating apparatus comprising:
    an enclosure having an interior;
    a quartz halogen lamp adapted for heating the interior of the enclosure;
    a reflector adjacent the lamp for reflecting thermal radiation generated by the lamp into the interior of the enclosure, the reflector having a surface region formed of polished aluminum; and
    a thermally-reflective coating overlaying and contacting the surface region of the reflector, the coating comprising at least one adjacent pair of layers formed of metal oxides that are substantially transparent to electromagnetic wavelengths of between 500 and 3000 nanometers, an outermost layer of the pair of layers having a higher index of refraction than an innermost layer of the pair of layers, the innermost layer being thicker than the outermost layer by a factor inversely proportional to their indices of refraction;
    wherein the lamp is operable to heat a superalloy article in the interior of the enclosure to a temperature of at least 1500° F.

12. A heating apparatus as recited in claim 11, wherein the reflector with the coating has a reflectivity of greater than 95% for electromagnetic wavelengths of about 750 to about 1200 nanometers.

13. A heating apparatus as recited in claim 11, wherein the coating has a thickness of about 100 to about 5000 nm.

14. A heating apparatus as recited in claim 11, wherein the coating comprises a first layer adjacent the surface region, a second layer on the first layer, a third layer on the second layer, and a fourth layer on the third layer, the first and third layers being formed of silica, the second and fourth layers being formed of titania.

15. A method of welding a superalloy article, the method comprising the steps of:

provid ing an enclosure having an interior, a thermal radiation-generating device adapted for heating the interior of the enclosure, and a reflector member adjacent the thermal radiation-generating device for reflecting thermal radiation generated by the thermal radiation-generating device into the interior of the enclosure;

forming a thermally-reflective coating on the reflector member, the coating comprising at least one adjacent pair of layers formed of materials that are substantially transparent to infrared radiation at a predetermined wavelength, an outermost layer of the pair of layers being formed of a material having a higher index of refraction than an innermost layer of the pair of layers, the innermost layer being thicker than the outermost layer by a factor inversely proportional to their indices of refraction;

placing a superalloy article in the interior of the enclosure;

operating the thermal radiation-generating device to heat the superalloy article to a temperature of at least 1500° F.; and then welding the superalloy article.

16. A method as recited in claim 15, wherein the reflector member with the coating has a reflectivity of greater than 90% for electromagnetic wavelengths of about 700 to about 1250 nanometers.

17. A method as recited in claim 15, wherein the outermost layer is a material selected from the group consisting of titania, tantala, zirconia and niobium oxide, and wherein the innermost layer is a material selected from the group consisting of refractory fluorides, silica and alumina.

18. A method as recited in claim 15, wherein the coating consists of a first layer on a surface of the reflector member, a second layer on the first layer, a third layer on the second layer, and a fourth layer on the third layer, the second and fourth layers being formed of a material having an index of refraction of about 2 to 2.3, the first and third layers being formed of a material having an index of refraction of about 1.25 to 1.7, the second and fourth layers having thicknesses of about 80 to about 148 nm and the first and third layers having thicknesses of about 117 to about 217 nm.

19. A method as recited in claim 15, wherein the reflector member has a surface region formed of polished aluminum, and the coating is deposited on the surface region so as to contact the surface region.

20. A method as recited in claim 15, wherein the step of forming the coating comprises a sputtering process.

* * * * *